2,946,793
Patented July 26, 1960

2,946,793
CARBINOL AMINES

Raymond J. Michaels, Jr., Mundelein, and Harold E. Zaugg, Lake Forest, Ill., assignors to Abbott Laboratories, North Chicago, Ill., a corporation of Illinois No Drawing. Filed Sept. 25, 1957, Ser. No. 686,014

7 Claims. (Cl. 260—268)

This invention relates to a new series of carbinol amines and to novel methods of preparing same. The compounds of this invention are represented by the following structural formula:

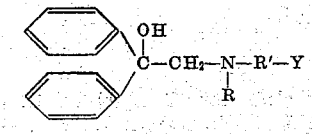

where R is hydrogen or a lower alkyl group. Attached to the N are various aliphatic alkylamino groups, N-heterocyclic, substituted alkyl and the like. The alkylene carbon chain of such alkylamino groups is represented by R' which may be straight or branched. Y represents N-heterocyclic rings and secondary and tertiary amines which are linked to the carbon chain through an N atom.

Among the secondary and tertiary amines, can be listed representative groups such as dimethylamino, diethylamino, methylamino and the like. Representative N-heterocyclic rings are pyrrolidine, piperidine, cyclohexylamine, piperazine, morpholine, pyridine, pyrazine and the like. Lower alkyl substituents on the N-heterocyclic rings are also included in the group of amines represented by the symbol Y as, for example, 2,6-dimethylmorpholine, 3,5-methylpiperazine and the like.

The compounds are prepared by reacting 1,1-diphenylethylene oxide

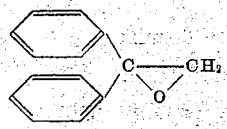

with primary and secondary amine groups comprising a portion of alkyl diamine compounds. In this manner, the primary amine groups in tertiaryaminoalkylamines such as dimethylaminoethylamine, diethylaminoethylamine, dimethylaminopropylamine, 1-methyl - 4 - ethylaminopiperazine, N-β-aminoethylpiperidine, 2-dimethylamino-2-methylpropylamine and the like participate in the reaction with 1,1-diphenylethylene oxide to give the aminoalkylamine derivatives of 1,1-diphenylethylene oxide. The foregoing primary amine groups in the listed compounds produce derivatives where R is H in the skeletal chemical structure as presented hereinbefore.

Reacting 1,1-diphenylethylene oxide with tertiaryaminoalkyl secondary amine compounds provides tertiaryaminoalkylamine derivatives of β-substituted derivatives of α,α-diphenylethanol where R is a lower alkyl and X is N in the chemical structure representing the novel compounds of this invention. Typical compounds operable in this particular reaction are dimethylaminoethyl methylamine, N-methyl-N'-methyl ethylenediamine, and the like.

Salts of the foregoing compounds are prepared and are intended to comprise a part of this invention. By the term "salts," it is intended that they include acid addition salts of said compounds, as well as the quaternary ammonium salts formed at the tertiary nitrogen in the amine portion of the instant compounds.

The compounds of this invention have been found to show antispasmodic activity and anti-parkinson activity.

The following examples are intended to serve as an illustration of the workings of this invention and are not intended to limit the products and steps to the exact ingredients and proportions stated therein.

EXAMPLE I

N,N-dimethyl-N'-(β,β-diphenyl-β-hydroxyethyl)-propylenediamine 1,1-diphenylethylene oxide (2.9 gms., .015 mole) is added portionwise to 3-dimethylaminopropylamine (4.6 gms., .045 mole) and the resulting mixture is heated for 16 hours on the steam bath. About 50 cc. of water is added to the cooled reaction mixture to precipitate the crude oily product. The product is extracted with ether and the extract is dried over anhydrous sodium sulfate.

The drying agent is removed by filtration and the ether is evaporated to isolate the product, N,N-dimethyl-N'-(β,β-diphenyl-β-hydroxyethyl) propylenediamine. The product is taken up in 30 cc. of isopropyl alcohol and excess isopropyl alcoholic hydrogen chloride, from which the dihydrochloride salt of N,N-dimethyl-N'-(β,β-diphenyl-β-hydroxyethyl) propylenediamine is precipitated in a yield of 46%, M.P. 274–249° C.

Analysis.—Calcd. for $C_{19}H_{26}N_2O \cdot 2HCl$: C, 61.45%; H, 7.60%; N, 7.55%. Found: C, 61.78%; H, 7.48%; N, 7.44%.

EXAMPLE II

N,N-diethyl-N'-(β,β-diphenyl-β-hydroxyethyl) ethylenediamine 1,1-diphenylethylene oxide (2.9 gms., .015 mole) is combined with diethylaminoethylamine (4.6 gms., .045 mole) and the reaction is conducted according to the procedure of Example I.

The M.P. of the dihydrochloride salt of the above named diamine is 218–9° C. and it is collected in a yield of 1.8 gms., 31%.

Analysis.—Calcd. for $C_{20}H_{28}N_2O \cdot 2HCl$: C, 62.33%; H, 7.85%; N, 7.27%. Found: C, 62.29%; H, 7.75%; N, 7.33%.

EXAMPLE III 2,6-dimethyl-4-(β,β-diphenyl-β-hydroxyethylaminopropyl)-morpholine 1,1-diphenylethylene oxide (2.0 gms., .01 mole) is combined with 3-(N-2,6 - dimethylmorpholino) - propylamine (3.4 gms., .02 mole) and the reaction is conducted according to the procedure of Example I.

The M.P. of the dihydrochloride salt of the above named amine is 172–3° C. and it is collected in a yield of 1.5 gms.

Analysis.—Calcd. for $C_{23}H_{32}N_2O_2 \cdot 2HCl$: C, 62.58%; H, 7.76%; N, 6.35%. Found: C, 62.36%; H, 8.04%; N, 6.15%.

EXAMPLE IV

N-(β,β-diphenyl-β-hydroxyethylaminopropyl)-morpholine 1,1-diphenylethylene oxide (2.9 gms., .015 mole) is combined with N - (3 - aminopropyl) - morpholine (3.7 gms., .026 mole) and the reaction is conducted according to the procedure of Example I.

The M.P. of the dihydrochloride salt of the above named amine is 228–9° C. and it is collected in a yield of 4.3 gms.

*Analysis.*—Calcd. for $C_{21}H_{28}N_2O_2 \cdot 2HCl$: C, 61.01%; H, 7.32%; N, 6.78%. Found: C, 60.79%; H, 7.45%; N, 6.62%.

EXAMPLE V

*N,N'-dimethyl-N'-(β,β-diphenyl-β-hydroxyethyl) ethylenediamine*

1,1-diphenylethylene oxide (2.9 gms., .015 mole) is combined with N-methyl-N'-methyl ethylenediamine (2.6 gms., .03 mole) and the reaction is conducted according to the procedure of Example I.

The M.P. of the dihydrochloride salt of the above named diamine is 217–8° C. and it is collected in a yield of 3.4 gms., 63%.

*Analysis.*—Calcd. for $C_{18}H_{24}N_2O \cdot 2HCl$; C, 60.50%; H, 7.34%; N, 7.84%. Found: C, 61.16%; H, 7.23%; N, 7.83%.

EXAMPLE VI

*N,N,N'-trimethyl-N'-(β,β-diphenyl-β-hydroxyethyl) ethylenediamine*

1,1-diphenylethylene oxide (2.9 gms., .015 mole) is combined with dimethylaminoethyl methylamine (3.1 gms., .03 mole) and the reaction is conducted according to the procedure of Example I.

The M.P. of the dihydrochloride salt of the above named diamine is 238–9° C. and it is collected in a yield of 2.6 gms., 46%.

*Analysis.*—Calcd. for $C_{19}H_{26}N_2O \cdot 2HCl$: C, 61.45%; H, 7.60%; N, 7.55%. Found: C, 61.43%; H, 7.61%; N, 7.49%.

EXAMPLE VII

*1-methyl-4-(β,β-diphenyl-β-hydroxyethylaminopropyl)- piperazine*

1,1-diphenylethylene oxide (2.9 gms., .015 mole) is combined with 1-methyl-4-(α-aminopropyl)-piperazine (4.3 gms., .03 mole) and the reaction is conducted according to the procedure of Example I.

The M.P. of the dihydrochloride salt of the above named amine is 284–5° C. and it is collected in a yield of 3.5 gms.

*Analysis.*—Calcd. for $C_{22}H_{31}N_3O \cdot 3HCl$; C, 57.08%; H, 7.40%; N, 9.08%; Cl, 22.98%; O, 3.46%. Found: C, 57.29%; H, 7.47%; N, 9.08%; Cl, 22.98%; O, 3.50%.

EXAMPLE VIII

*N-(β,β-diphenyl-β-hydroxyethyl-aminoethyl) pyrrolidyl*

1,1-diphenylethylene oxide (2.9 gms., .015 mole) is combined with 2-pyrrolidylethylamine (3.4 gms., .03 mole) and the reaction is conducted according to the procedure of Example I.

The M.P. of the dihydrochloride salt of the above named amine is 235–6° C. and it is collected in a yield of 2.2 gms.

*Analysis.*—Calcd. for $C_{20}H_{26}N_2O \cdot 2HCl$; C, 62.66%; H, 7.36%; N, 7.31%. Found: C, 62.75%; H, 7.22%; N, 7.30%.

EXAMPLE IX

*1-(β,β-diphenyl-β-hydroxyethylamino)-2-dimethylamino- 2-methylpropane*

1,1-diphenylethylene oxide (2.9 gms., .015 mole) is combined with 2-dimethylamino-2-methylpropylamine (3.5 gms., .03 mole) and the reaction is conducted according to the procedure of Example I.

The M.P. of the dihydrochloride salt of the above named amine is 180–1° C. and it is collected in a yield of 2.6 gms.

*Analysis.*—Calcd. for $C_{20}H_{28}N_2O \cdot 2HCl$: C, 62.33%; H, 7.85%; N, 7.27%. Found: C, 61.56%; H, 7.71%; N, 7.00%.

EXAMPLE X

*N-diethyl-N'-(β,β-diphenyl-β-hydroxyethyl)- propylenediamine*

1,1-diphenylethylene oxide (2.9 gms., .015 mole) is combined with α-diethylaminopropylamine (3.9 gms., .03 mole) and the reaction is conducted according to the procedure of Example I.

The M.P. of the dihydrochloride salt of the above named diamine is 152–3° C. and it is collected in a yield of 2.2 gms.

*Analysis.*—Calcd. for $C_{21}H_{30}N_2O \cdot 2HCl \cdot H_2O$: C, 60.43%; H, 8.21%; N, 6.71%; Cl, 16.99%; O, 7.66%. Found: C, 60.86%; H, 8.04%; N, 6.54%; Cl, 16.67%; O, 8.22%.

EXAMPLE XI

*N-dimethyl-N'-(β,β-diphenyl-β-hydroxyethyl) ethylenediamine*

1,1-diphenylethylene oxide (3.3 gms., .017 mole) is added portionwise to dimethylaminoethylamine (4.5 gms., .051 mole). A clear solution is formed and the mixture is then heated on a steam bath for 18 hours. After the reaction mixture is cooled, the oily product solidifies.

This crude product is recrystallized 3 times from Skelly B to a constant M.P. of 93–4° C. The wt. of the product is 2½ gms., 52% yield.

*Analysis.*—Calcd. for $C_{18}H_{24}N_2O$: C, 76.02%; H, 8.51%; N, 9.85%. Found: C, 75.59%; H, 8.29%; N, 9.46%.

EXAMPLE XII

*N-(β,β-diphenyl-β-hydroxyethylaminoethyl)-piperidine*

1,1-diphenylethylene oxide (2.9 gms., .015 mole) is added portionwise to N-β-aminoethylpiperidine (3.8 gms., .03 mole) containing 4 drops of water. The mixture is heated for 18 hours on a steam bath. After the reaction mixture is cooled, the crude product solidifies.

This base is recrystallized 3 times from pentane to a constant M.P. of 57–8° C. The wt. of the obtained product is 1.5 gms.

*Analysis.*—Calcd. for $C_{21}H_{28}N_2O$: C, 77.73%; H, 8.70%; N, 8.64%. Found: C, 78.04%; H, 8.85%; N, 8.63%.

Others may practice the invention in any of the numerous ways which will be suggested by this disclosure to one skilled in the art. All such practice of the invention is considered to be a part hereof provided it falls within the scope of the appended claims.

We claim:

1. N,N' - dimethyl - N' - (β,β - diphenyl - β - hydroxyethyl) ethylenediamine.

2. N - (β,β - diphenyl - β - hydroxyethylaminoethyl) pyrrolidine.

3. 1 - methyl - 4 - (β,β - diphenyl - β - hydroxyethylaminoethyl)-piperazine.

4. N,N - dimethyl - N' - (β,β - diphenyl - β - hydroxyethyl) propylenediamine.

5. N,N,N' - trimethyl - N' - (β,β - diphenyl - β - hydroxyethyl) ethylenediamine.

6. A compound represented by the structural formula:

$$\phi_1-\underset{OH}{\underset{|}{C}}-CH_2-NH-\text{lower alkylene}-N\underset{\text{lower alkyl}}{\overset{\text{lower alkyl}}{<}}$$

7. A compound selected from the group consisting of bases represented by $$\phi_1-\underset{OH}{\underset{|}{C}}-CH_2-\underset{R}{\underset{|}{N}}-R'-Y$$

where R is selected from the group consisting of hydrogen and lower alkyl; R' is an alkylene group consisting of 1 to 4 carbon atoms and Y is a substituent containing an N atom through which a linkage is made to R' and is selected from the group consisting of monoalkylamino, diloweralkylamino, piperidino, morpholino, pyrrolidino and dialkylmorpholino and the non-toxic, acid addition salts thereof.

References Cited in the file of this patent

UNITED STATES PATENTS

| | | |
|---|---|---|
| 2,575,122 | Pollard et al. | Nov. 13, 1951 |
| 2,600,217 | Denton et al. | June 10, 1952 |

FOREIGN PATENTS

| | | |
|---|---|---|
| 740,879 | Germany | Nov. 2, 1943 |